(12) United States Patent
Teicher et al.

(10) Patent No.: US 8,745,409 B2
(45) Date of Patent: Jun. 3, 2014

(54) SYSTEM AND METHOD FOR SECURING PORTABLE DATA

(75) Inventors: Mordechai Teicher, Hod Hasharon (IL); Aran Ziv, Herzliya (IL); Noam Shintel, Ramat Hasharon (IL)

(73) Assignee: SanDisk IL Ltd., Kfar Saba (IL)

( * ) Notice: Subject to any disclaimer, the term of this patent is extended or adjusted under 35 U.S.C. 154(b) by 1115 days.

(21) Appl. No.: 10/359,195

(22) Filed: Feb. 6, 2003

(65) Prior Publication Data

US 2004/0123127 A1 Jun. 24, 2004

Related U.S. Application Data

(60) Provisional application No. 60/433,992, filed on Dec. 18, 2002.

(51) Int. Cl.
*G06F 9/00* (2006.01)

(52) U.S. Cl.
USPC ........... 713/193; 713/192; 713/169; 713/159; 713/155; 705/34; 705/55; 711/164; 726/2; 726/4; 726/5; 726/27

(58) Field of Classification Search
USPC ............ 726/27; 713/172, 182, 159, 155, 169, 713/192, 193; 705/34, 55; 455/411; 711/164; 709/229
See application file for complete search history.

(56) References Cited

U.S. PATENT DOCUMENTS

| | | | |
|---|---|---|---|
| 5,754,646 A * | 5/1998 | Williams et al. ................. 705/55 |
| 6,268,789 B1 * | 7/2001 | Diamant et al. ............. 340/5.74 |
| 6,438,550 B1 * | 8/2002 | Doyle et al. ....................... 726/2 |
| 6,523,119 B2 * | 2/2003 | Pavlin et al. .................. 713/192 |
| 6,671,808 B1 * | 12/2003 | Abbott et al. ...................... 726/4 |
| 6,880,054 B2 * | 4/2005 | Cheng et al. .................. 711/164 |
| 7,032,240 B1 * | 4/2006 | Cronce et al. ...................... 726/2 |
| 7,474,888 B1 * | 1/2009 | Davis et al. .................... 455/411 |
| 7,752,095 B1 * | 7/2010 | Laracey et al. ................. 705/34 |
| 2001/0003842 A1 * | 6/2001 | Schaeck et al. ............... 713/169 |

(Continued)

FOREIGN PATENT DOCUMENTS

| | | |
|---|---|---|
| EP | 1 089 156 | 4/2001 |
| JP | 07-114501 | 5/1995 |

(Continued)

OTHER PUBLICATIONS

U.S. Appl. No. 10/304,772, filed Nov. 2002, Ziv et al.

(Continued)

*Primary Examiner* — Beemnet Dada
*Assistant Examiner* — Sayed Beheshti Shirazi
(74) *Attorney, Agent, or Firm* — Brinks Gilson & Lione

(57) ABSTRACT

A data storage device that can be reversibly associated with one or more of a plurality of hosts. A "trusted" host on which the device is mounted is allowed access to a secure data area of the device automatically, without the user having to enter a password. Ways in which a host is designated as "trusted" include storing the host's ID in a trusted host list of the device, storing a representation of the host's ID that was encrypted using a trust key of the device in a cookie in the host, or storing a storage password of the device in a password list of the host. Alternatively, an untrusted host is allowed access to the secure data area if a user enters a correct user password.

18 Claims, 14 Drawing Sheets

(56) References Cited

U.S. PATENT DOCUMENTS

| | | |
|---|---|---|
| 2002/0099837 A1* | 7/2002 | Oe et al. .................. 709/229 |
| 2003/0229782 A1* | 12/2003 | Bible et al. ................ 713/155 |
| 2004/0073787 A1* | 4/2004 | Ban et al. .................. 713/159 |
| 2005/0257254 A1* | 11/2005 | Hamada ....................... 726/5 |

FOREIGN PATENT DOCUMENTS

| | | |
|---|---|---|
| JP | 10-334197 | 12/1998 |
| JP | 2001-209586 | 8/2001 |
| JP | 2003-524842 | 4/2002 |
| JP | 2002-344620 | 11/2002 |
| WO | WO01/61692 | 8/2001 |

OTHER PUBLICATIONS

International Search Report for application No. PCT/IL03/00924 dated Apr. 7, 2004 (4 pages).

Office Action issued in corresponding JP Appln. No. 2005-502479 dated Jul. 30, 2010 (4 pgs).

Office Action issued in corresponding EP Appln. No. 03773950.5 dated May 5, 2011 (4 pgs).

* cited by examiner

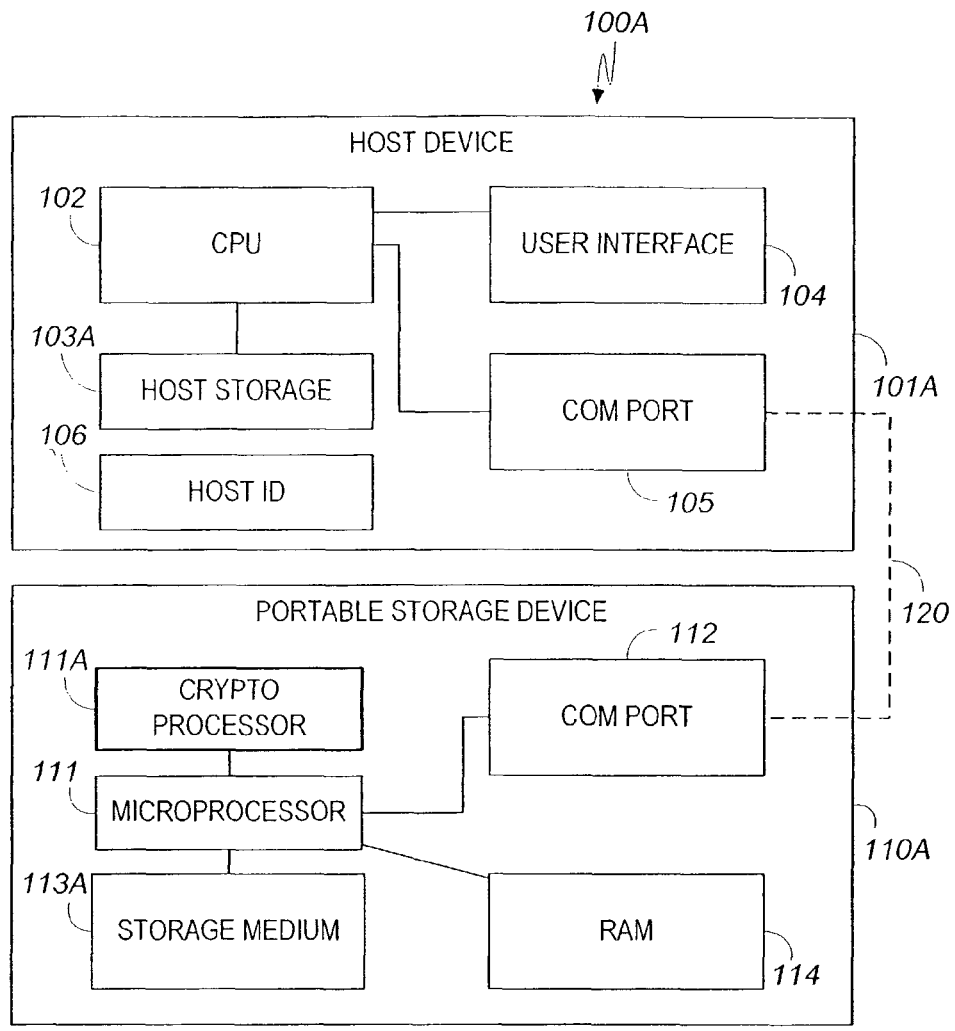
FIG. 7
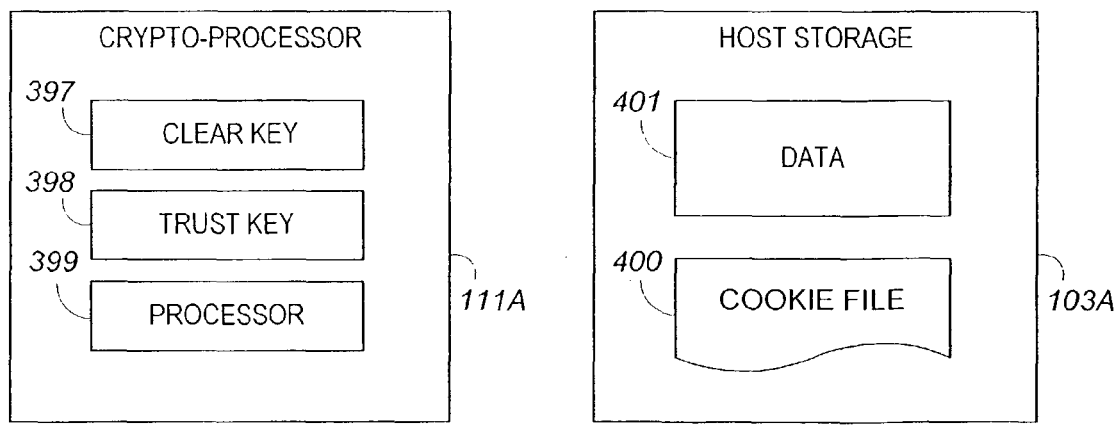
FIG. 7A　　　　　　　　FIG. 8

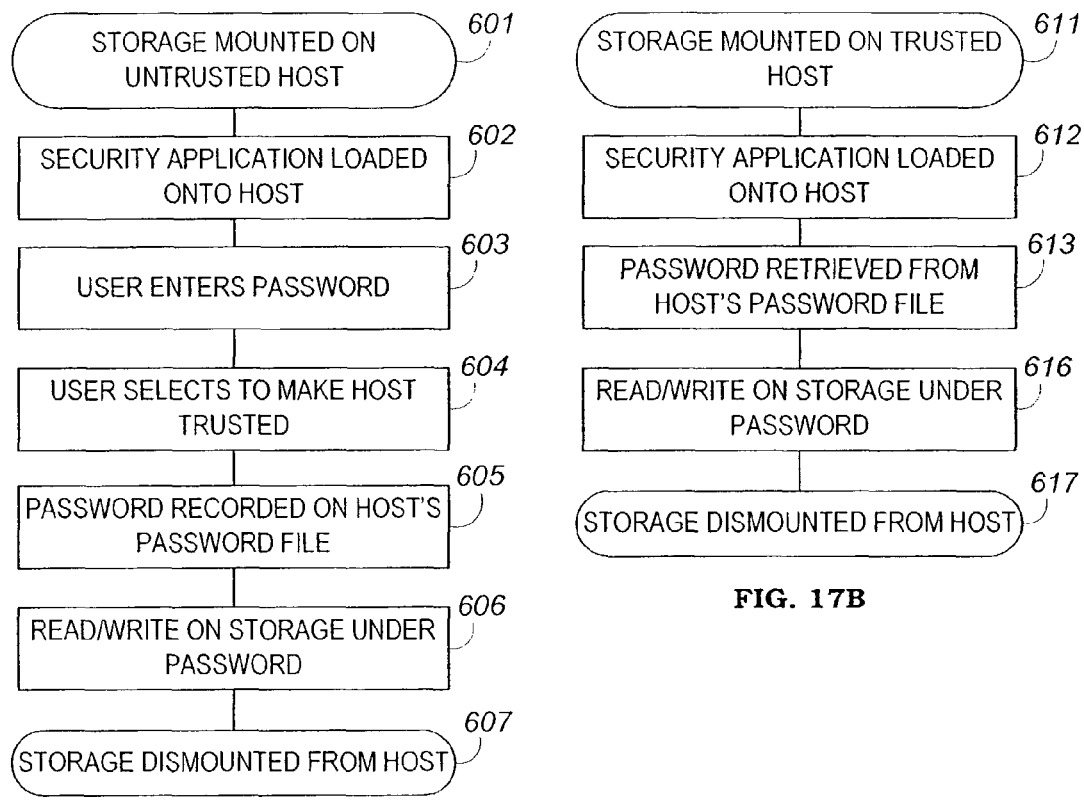

SYSTEM AND METHOD FOR SECURING PORTABLE DATA

This is a continuation-in-part of U.S. Provisional Patent Application Ser. No. 60/433,992, filed on Dec. 18, 2002.

FIELD AND BACKGROUND OF THE INVENTION

The present invention relates to portable storage devices and, more particularly, to a secure portable storage device.

Portable storage devices such as floppy disks, optical disks, flash memory disks and digital tapes, serve users for various purposes, such as copying files from one computer to another, carrying a backup copy of one's files, or synchronizing work spaces among the hard disks of an office PC, a home PC and a laptop computer.

Portable devices can be lost or stolen, exposing their owner to the risk of others reading sensitive information from his/her work or private files. Therefore, it is highly desirable to secure information stored on a portable storage device under the user's password or biometric signature. An obvious way to do so is by encrypting the files on a source computer prior to copying the files to the portable storage device and then retrieving the encrypted version at a target computer and decrypting the files there for further use. This requires both manual effort at both ends, as well as having the same security software at both ends, which are inconvenient and often impractical.

Some recent portable storage devices include an onboard processor, which allows incorporating security functions within the device. For example, DiskOnKey™, a commercial portable flash disk produced by M-Systems Flash Disk Pioneers, Ltd. of Kfar Saba, Israel, features a locking utility called KeySafe, which offers a secure partition within the storage device, A user's password is required both for accessing the secure partition and reading files therefrom, because files are encrypted on-the-fly by the unit's onboard processor when written onto the secure partition and decrypted on-the-fly when read from the secure partition. The security mechanism of KeySafe is described in co-pending U.S. patent application publication No. 2004/0103288 titled "Apparatus and method for securing data on a portable storage device", which is incorporated herein by reference for all purposes as if fully set forth herein.

In a typical scenario, the user mounts his/her portable storage device on a computer, unlocks the portable storage device by keying-in a password (or entering a biometric signature, e.g. through a fingerprint reader), and then copies files from one device to another. File copying can be done either manually, or by using backup or synchronization utilities, such as the Briefcase folder synchronization utility which is part of the Microsoft Windows™ operating system.

Entering a password or a biometric signature each time the portable storage device is mounted is inconvenient. This inconvenience will often drive users to give up security and carry all their files in clear thus overlooking the risk of loss or theft. The current conflict between security and convenience is a drawback of current securable portable storage devices.

There is thus a widely recognized need for, and it would be highly advantageous to have, a portable storage device on which data can be securely stored and retrieved in a manner that would overcome the disadvantages described above.

DEFINITIONS

By a "portable storage device" is meant a storage device that is not permanently associated with a host device, but instead may be dismounted by a user from the first host device with which the storage device was used, and then may be mounted by the user on another host device. By a "secure storage device" is meant a storage device that excludes access to data stored therein unless some credentials are presented to the device. Access exclusion can be based on using logical or hardware means to disable access to the protected data, and/or on keeping the data encrypted thus useless to the one accessing it. Credentials can be a user's password or biometric signature, or a key or authentication procedure provided by an entity authorized by the user to access his/her data. Optionally, a secure storage device includes an autonomous processor and software to manage access and encryption, as is the case with the DiskOnKey™ product mentioned above. However, a secure device can also lack such an autonomous processor and rely upon encryption by the host computer. The data storage devices of the present invention preferably are both secure and portable.

By "computer", or alternatively "host", is meant any computerized device connectable to the secure portable storage device. Examples of a computer or host include a desktop or laptop computer, a handheld computer, a mobile communicator, and other computerized devices that store files As used herein, the term "host" or "computer" also refers to a logical partition, of a physical computer, that is accessed by a log-in procedure, so that two logical partitions of the same physical computer are considered herein to be two different "hosts" or "computers" if access to the two logical partitions is obtained using different usernames and passwords. As used herein, the term "host" or "computer" also refers to a computer that is part of a network of several computers and whose identity is determined by a log-in procedure, so that two physically different computers of the same network are considered herein to be the same "host" or "computer" if access to both computers is obtained using the same username and password. A "trusted" host is a host that is allowed automatic access to secure data whenever the data storage device is mounted on the host, without requiring the user to enter a password. This is in contrast to the prior art technology of the above-referenced U.S. Ser. No. 200410103288, which requires the user to enter a password to obtain access to secure data. An "untrusted" host is a host that is not trusted.

The term "password" is understood herein to include both a password keyed in to a host by a user and also (or alternatively) a biometric signature that, when read by a suitable reader uniquely identifies the user.

By "mounting" is meant the process of connecting a secure portable storage device to a computer and completing a logical handshaking enabling the computer to exchange data with the secure portable storage device. Mounting can use a physical connection, e.g. USB (universal serial bus), or can be wireless, e.g. using a Bluetooth link or a mobile communication link.

By "accessing" is meant the operations that a computer or host typically does to data stored on a storage device, or to data that is to be stored on a storage device, including but not limited to reading, writing and erasing the data.

The description below refers to "representations" of host IDs, passwords and clear keys. A "representation" of a host ID, a password or a key is a transformation of the host ID, password or key that allows the original host ID, password or key to be uniquely identified. Typically, the transformation of a host ID is a hash or an encryption of the host ID, the transformation of a password is a hash of the password and the transformation of a key is an encryption of the key; but the scope of the term "representation" also includes the identity transformation, so that a host ID, password or key is considered to be a representation of itself.

SUMMARY OF THE INVENTION

It is an object of the present invention to eliminate the conflict between security and convenience by automating the unlocking procedure of a secure portable storage device in the presence of a trusted computer.

Another object of the present invention is to retain the option of conventional unlocking in the presence of an untrusted computer.

According to the present invention there is provided a data storage device including: (a) a storage medium including a secure data area for storing secure data; and (b) a mechanism for allowing access to the secure data by a host device, on which the data storage device is mounted, if the host device is a trusted host device.

According to the present invention there is provided a method of associating at least one of a plurality of host devices with a data storage device as a trusted host device of the data storage device, the data storage device having a secure data area for storing secure data, the method including the steps of: (a) providing each of the host devices with a respective host ID; and (b) for each of the at least one host device that is to be associated with the data storage device: storing the respective host ID in a trusted host list in the data storage device.

According to the present invention there is provided a method of associating at least one of a plurality of host devices with a data storage device as a trusted host device of the data storage device, the data storage device having a secure data area for storing secure data, the method including the steps of: (a) providing each of the host devices with a respective host ID; (b) providing the data storage device with a trust key; and (c) for each of the at least one host device that is to be associated with the data storage device: (i) encrypting the respective host ID of the each host device using the trust key, thereby providing an access-permitting encrypted representation of the respective host ID of the each host device, and (ii) storing the access-permitting encrypted representation of the encrypted respective host ID of the each host device in the each host device.

According to the present invention there is provided a method of associating at least one of a plurality of host devices with a data storage device as a trusted host device of the data storage device, the data storage device having a secure data area for storing secure data, the method including the steps of: (a) providing the data storage device with a representation of a storage password; and (b) for each of the at least one host device that is to be associated with the data storage device: (i) providing a respective password list, and (ii) including the storage password in the respective password list.

According to the present invention there is provided a method of using a data storage device together with a plurality of host devices, including the steps of: (a) designating at least one of the host devices as a trusted host device relative to the data storage device; (b) mounting the data storage device on one of the host devices; and (c) if the one host device, on which the data storage device is mounted is a trusted host device: allowing access, by the one host device on which the data storage device is mounted, to a secure data area in the data storage device.

Different embodiments of the data storage device of the present invention have different mechanisms for determining whether a host is a trusted host and so is automatically entitled to access to the secure data area of the data storage device.

In one embodiment of the data storage device of the present invention, in addition to the secure data area, the storage medium includes a trusted host list. The mechanism compares a host ID of the host device to the trusted host list. If the trusted host list includes a representation (e.g., a hash) of the host ID, then the host device is deemed to be a trusted host device.

In another embodiment of the data storage device of the present invention, the mechanism interrogates a cookie file on the host device to determine whether the host device is a trusted host device. In this context, "interrogating" the cookie file includes verifying the presence of the cookie file in the host device. Preferably, the mechanism also participates in creating the cookie file. More preferably, the mechanism includes a cryptoprocessor that encrypts a host ID of the host device during the creation of the cookie file. The encrypted host ID then is included in the cookie file. Preferably and alternatively, one function of the cryptoprocessor is to decrypt records of the cookie file. If one of the decrypted records is substantially identical to the host ID of the host device, then the host device is deemed to be a trusted host device.

In yet another embodiment of the present invention, the mechanism includes a representation of a storage password and a security application that, when executed by the host device, enables the host device to compare the representation of the storage password to a password list that is stored in the host device. The host device is deemed to be a trusted host device if the password list includes the representation of the storage password. Preferably, the security application is such that an untrusted host device can use the security application to transform itself into a trusted host device by entering the representation of the storage password into its password list. Preferably, the mechanism also includes a representation of a storage ID that the host uses to look up the representation of the storage password in the password list.

Some variants of the data storage device of the present invention allow only trusted hosts to have access to the secure data storage area. Preferably, however, the storage medium also includes a stored representation (e.g., a hash) of a user password. The mechanism compares the stored representation of the password to a representation of an alleged user password. If the two representations are substantially identical, then the host device is allowed access to the secure data area of the data storage device (for this session only) even though the host device is not a trusted host device.

Optionally, in all embodiments, the storage medium also includes a clear data area to which the host device has unconditional access.

Preferably, all embodiments include a representation of a clear key for encrypting and decrypting the secure data. In the first embodiment, a representation (most preferably an encrypted representation) of the clear key is stored in the storage medium. In the second embodiment, the representation of the clear key is the clear key itself, which preferably is stored in and protected by the cryptoprocessor. In the third embodiment, the clear key preferably is either the storage password itself or a random clear key encrypted by the storage password.

Preferably, all embodiments include a mechanism for converting an untrusted host device to a trusted host device. Preferably, all embodiments include a mechanism for converting one of a plurality of trusted host devices into an untrusted host device. Preferably, all embodiments include a mechanism for converting all of a plurality of trusted host devices into untrusted host devices substantially simultaneously.

In a first method of associating one or more of a plurality of host devices with a data storage device, the host IDs of the host devices that are to be associated with the data storage device are stored in a trusted host list in the data storage device. When the data storage device is mounted on one of the host devices, if the host ID of that host device is included in the trusted host list, then that host device is allowed access to the secure data area of the data storage device. Preferably, a representation of a user password is stored in the data storage device. If the host ID of the host device, on which the data storage device is mounted, is not present in the trusted host list, then the user enters an alleged user password in that host device. If the stored representation of the user password is substantially identical to a corresponding representation of the alleged user password, then that host device is allowed access to the secure data area of the data storage device.

Preferably, the association of any of the host devices with the data storage device is a reversible association. The preferred method of disassociating a host device from the data storage device is to delete the host device's host ID from the trusted host list.

In a second method of associating one or more of a plurality of host devices with a data storage device, the data storage device is provided with a trust key. The trust key is used to encrypt the host ID of each host device that is to be allowed access to the secure data area of the data storage device, and the thus-encrypted host ID is stored in the corresponding host device. The thus-encrypted host ID is referred to herein as an "access-permitting encrypted representation" of the host ID.

Preferably, the association of any of the host devices with the data storage device is a reversible association. To disassociate one host device from the data storage device, the corresponding access-permitting encrypted representation of the host ID is deleted from the host device. To disassociate all the host devices from the data storage device substantially simultaneously, the trust key is changed. In this context, "changing" the trust key includes deleting the trust key.

Optionally, some or all of the plurality of host devices, including all the host devices that are to be allowed access to the secure data area of the data storage device, are provided with respective cookie files. Each cookie file stores a list of encrypted representations of its host device's host ID. In the case of a host device that is to be allowed access to the secure data area of the data storage device, the list includes that host device's access-permitting encrypted representation of the host ID. When the data storage device is mounted on one of the host devices, the host ID of the host device is encrypted using the trust key. The thus-encrypted host ID is referred to herein as an "interrogative encrypted representation" of the host ID. If the host device includes a cookie file, and if the list of encrypted host IDs in the cookie file includes the interrogative encrypted representation of the host ID, then the host device is allowed access to the secure data area of the data storage device. More preferably, to allow access even if the list of encrypted host IDs does not include the interrogative encrypted representation of the host ID, or even if the host device doesn't have a cookie file at all, a representation of a user password is stored in the data storage device. The user enters an alleged user password in the host device. If the representation of the user password that is stored in the data storage device is substantially identical to a corresponding representation of the alleged user password, then the host device is allowed access to the secure data area of the data storage device.

Preferably, in both the first and second methods, a representation (e.g. an encrypted representation) of a clear key is stored in the data storage device, and is used to encrypt and decrypt the secure data that is accessed by a host device that has been allowed access to those secure data.

In a third method of associating one or more of a plurality of host devices with a data storage device, the data storage device is provided with a representation of a storage password. The storage password is included in a respective password list of each host device that is to be allowed access to the secure data area of the data storage device. Preferably, in order for the storage password to be entered into a host device's password list, a representation of the storage password must be substantially identical to a corresponding representation of a user password that is entered to the host device.

Preferably, the association of any of the host devices with the data storage device is a reversible association. To disassociate all the host devices from the data storage device, the storage password is changed. In this context, "changing" the storage password includes deleting the storage password.

When the data storage device is mounted on one of the host devices, if the host device includes a password list that includes the storage password, then that host device is allowed access to the secure data area of the data storage device.

More generally, the scope of the present invention includes a method of using a data storage device that has a secure data storage area together with a plurality of host devices. One or more of the host devices is designated as a trusted host device relative to the data storage device. When the data storage device is mounted on one of the host devices, if that host device is a trusted host device, then that host device is allowed access to the secure data area. If that host device is not trusted, then the user may enter an alleged user password, with access to the secure data area by the host device on which the data storage device is mounted being contingent on the alleged user password being a valid user password.

While the data storage device is mounted on a trusted host device, the designation of the host device as a trusted host device may be canceled, thereby designating the host device as an untrusted host device. Furthermore, all the host devices may be rendered untrusted substantially simultaneously, even without mounting the data storage device on any of the host devices. For example, in the second method of reversibly associating host devices with a data storage device, changing the trust key of the data storage device renders all the host devices untrusted.

BRIEF DESCRIPTION OF THE DRAWINGS

The invention is herein described, by way of example only, with reference to the accompanying drawings, wherein:

FIG. 7 is a schematic block diagram of a second preferred embodiment of the present invention;

FIG. 7A is a schematic block diagram of a cryptoprocessor included in the second preferred embodiment;

FIG. 8 is a schematic block diagram of the host storage device which forms part of the second preferred embodiment of the present invention;

FIG. 16 is a table describing the content of a password file which is included in the system of FIG. 14;

FIGS. 17A-B are flowcharts describing two operation modes of the embodiment of FIG. 14;

DESCRIPTION OF THE PREFERRED EMBODIMENTS

The present invention is of a portable storage device that can restrict access to its secure data area only to selected host devices.

The principles and operation of a storage device according to the present invention may be better understood with reference to the drawings and the accompanying description.

Figure 1:
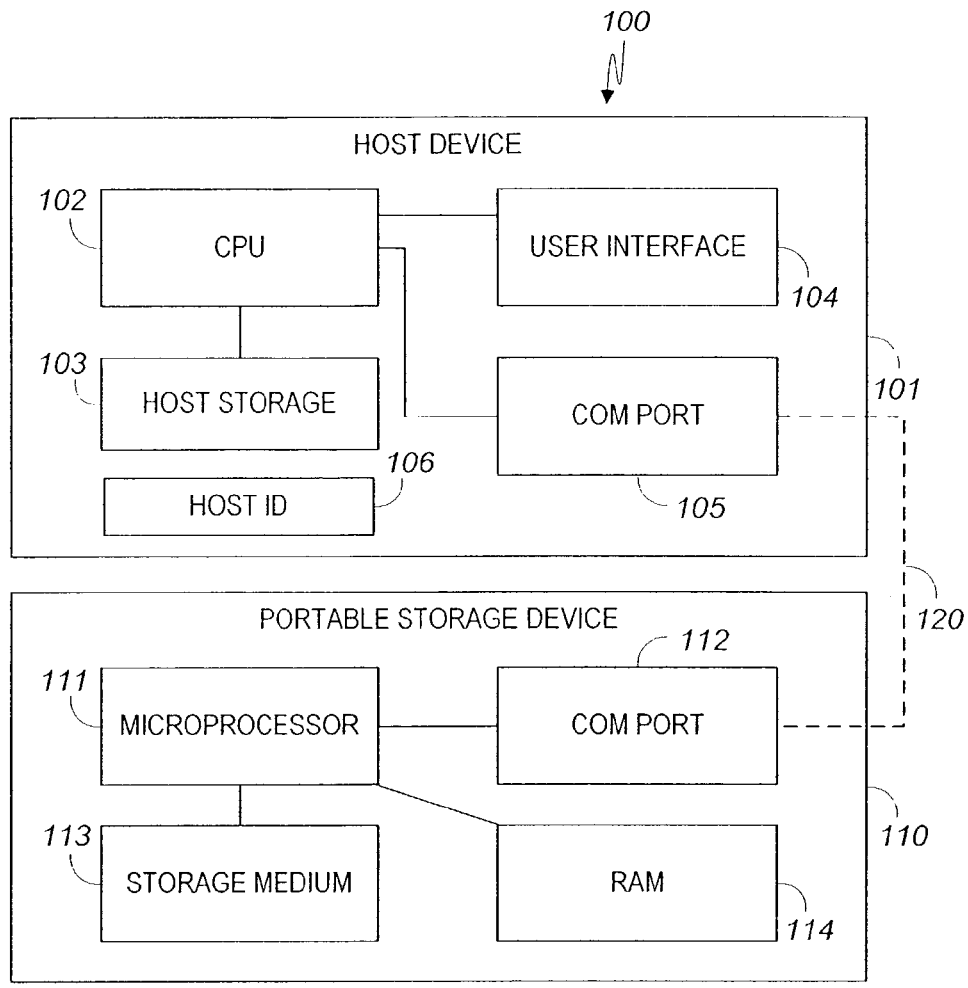
FIG. 1 is a schematic block diagram of a first preferred embodiment of the present invention.

Reference is now made to FIG. 1, wherein a system 100 of a first preferred embodiment of the present invention includes a host device 101 that is connectable to a portable storage device 110 via a communication link 120. Host device 101 can be a personal computer, a handheld computer, a mobile communicator, etc. Host device 101 includes a central processing unit (CPU) 102, a user interface 104 such a keyboard and screen, a storage device 103 such as a hard disk, and a communication port 105 such as a USB, Bluetooth or mobile link for communicating with external devices such as portable storage device 110. A host ID register 106 contains a unique alphanumeric or binary identification of host device 101, and preferably forms part of either storage device 103 or CPU 102. It should be noted that unique IDs for computers or their components are well known in the art; CPUs, hard disks and other fixed peripherals have unique serial numbers, and such serial numbers, individually or in combination with each other, form a unique ID that is accessible by CPU 102. Portable storage device 110 is connectable to host device 101 via link 120, and preferably employs a flash memory disk or a magnetic hard disk as a storage medium 113 to store data. A microprocessor 111, in cooperation with a volatile memory 114, runs applications for managing and controlling read/write operations on storage medium 113. Such read/write operations are made in the context of retrieving data to be sent to host device 101 and storing data received from host device 101, respectively.

Figure 2:
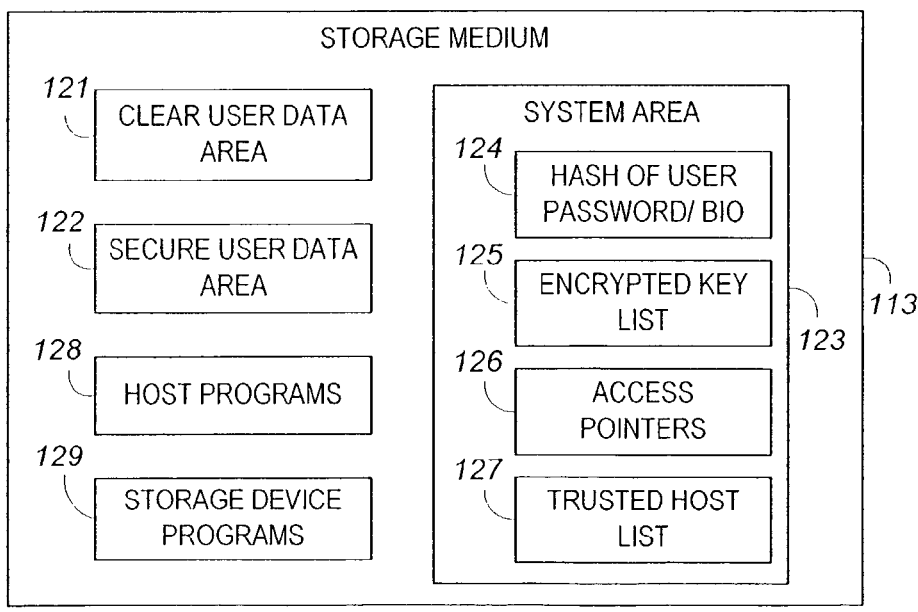
FIG. 2 is a schematic block diagram of a storage medium within the first preferred embodiment of the present invention.

FIG. 2 is an exploded view of the content of storage medium 113 of portable storage device 110. A clear user data area 121, which is optional in the present invention, stores user data that does not require a user password to access. A secure user data area 122 stores user data that requires a user password or other user-approved credentials for retrieval. A storage area 128 accommodates computer code of programs that run on CPU 102 of host device 101, while a storage area 129 accommodates computer code to run on microprocessor 111 of portable storage device 112. A system area 123 is accessible to microprocessor 111 only, for managing security-related parameters. A register 124 contains a hash of the user's password or of his/her biometric signature. A register 125 contains a list of encrypted versions of a randomly-selected key, that is referred to hereinafter as "clear key", and that is used to encrypt the content of secure user data area 122. The contents of register 125 are described below in more detail in reference to FIG. 2B. A trusted host list 127 includes the representation of unique IDs of host computers which were designated as trusted by the user.

Figures 2A, 2B, 3:
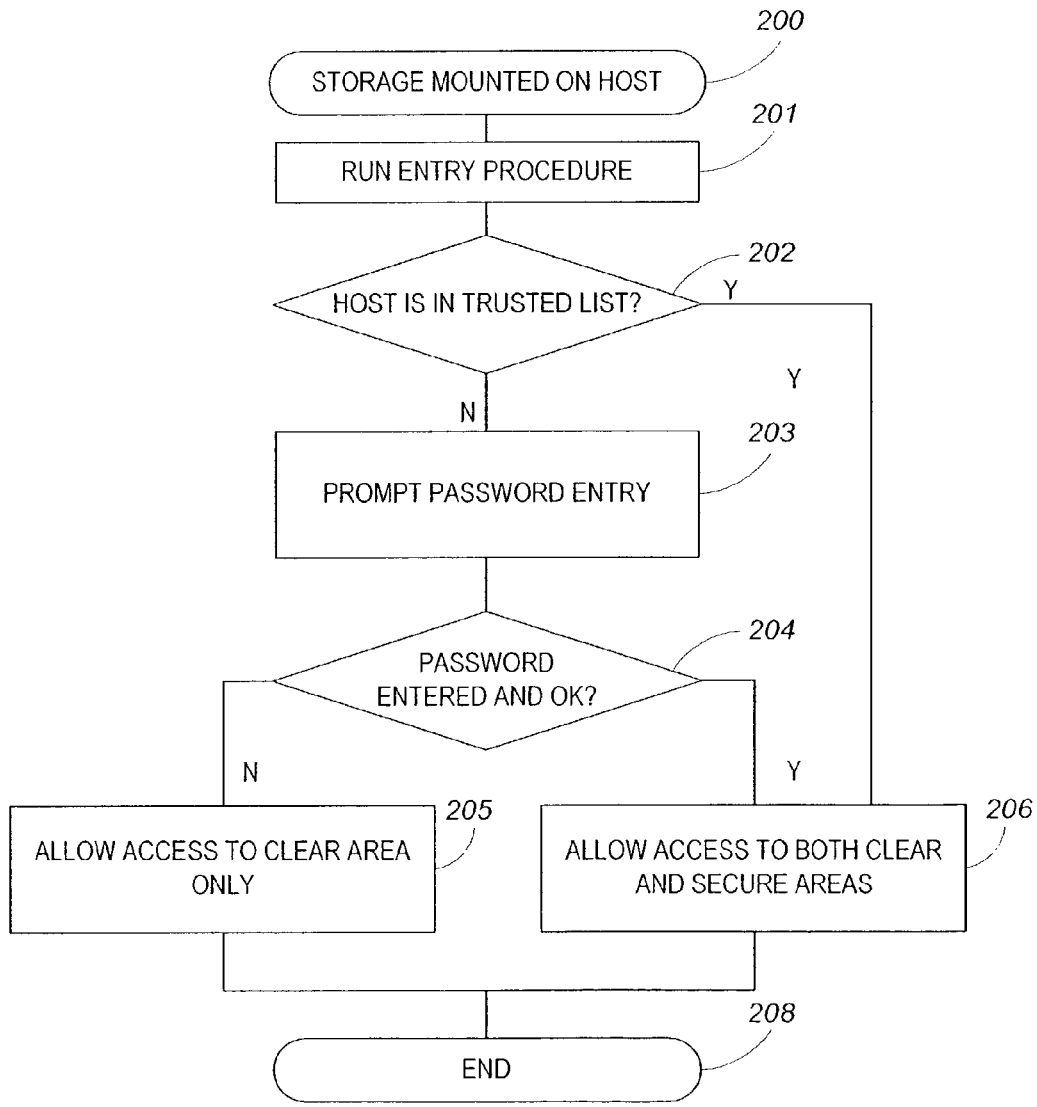
FIG. 2A is a schematic illustration of a trusted host list which forms part of the first preferred embodiment of the present invention.
FIG. 2B is a schematic illustration of an encrypted key list which forms part of the first preferred embodiment of the present invention.
FIG. 3 is a flowchart describing the operation of a first preferred embodiment of the present invention.

FIG. 2A illustrates an example of the contents of trusted host list 127. This exemplary list includes the hash of unique IDs of two computers. One of the two computers is specified as trusted indefinitely by assigning Dec. 31, 2999 as its expiry date, while the other computer has been assigned by the user a shorter trust period. The reason for using a hash rather than the host unique ID is to prevent attackers from retrieving the user ID from portable storage device 110 by disassembling portable storage device 110 using an external reader to retrieve the unique ID from register 124 and then using this unique ID to fake the trusted computer's environment when interfacing the portable storage device with a host.

FIG. 2B illustrates an example of the content of register 125, which contains a list of encrypted versions of the clear key used to encrypt the content of secure user area 122. The clear user key is generated randomly once when storage medium 113 is initiated or formatted, and is used subsequently for all on-the-fly encryption and decryption operations related to writing and reading operations in respect to secure area 122. An exemplary on-the-fly encryption and decryption is described in the above-referenced US patent application publication no. 2004/0103288. In order to prevent attackers from reading the clear key and thus becoming able to read the content of secure area 122, the clear key is kept encrypted within register 125. The encryption key used for encrypting the clear key varies according the method of accessing this key. In the exemplary list of FIG. 2B, the first line of the list includes an encrypted version of the clear key that is encrypted under the user's clear password. When the method of accessing secure area 122 is via manual entry of the user's password, as described below, the clear key is retrieved from the value shown in the rightmost column of the first line of FIG. 2B by using the user's password as entered. The two other lines in the list of FIG. 2B relate to the two trusted hosts included in the trusted host list of FIG. 2A. For each trusted host identified by the hash of the host's unique ID, there is a representation of the clear key encrypted by the host's unique ID in clear. Thus, somebody who finds portable storage device 112, and reads the content of register 125, still cannot retrieve the clear key without having access to the trusted host for reading its unique ID.

Reference is now made to FIG. 3, which describes the operation of the first preferred embodiment of the present invention described above. When portable storage device 110 is mounted on host device 101 in step 200, handshaking is made between the two devices, and portable storage device 110 becomes a disk drive of host 101, whereby clear user data area 121 as well as host program area 128 becomes accessible to CPU 102 of host device 101. In step 201*a* host utility program from area 128 is run either automatically, for example by an Autorun procedure included in the host operating system, or is called manually by the user. This utility program reads the host's unique ID from register 106 and sends the host's unique ID to a utility read from storage area 129 and running on microprocessor 111, to check, in step 202, whether the hash of the retrieved host ID is included in trusted host list 127 and has not expired. If the check is negative, no automatic access is allowed; and in step 203 the user may select to enter a password in order to access secure area 122 via steps 204 and 206. The password entered by the user to attempt to access secure area 122 is referred to herein as an "alleged" user password. If, however, the check in step 202 is positive, the user automatically has access to both clear area 121 and secure area 122 in step 206. In the case that neither was the host included in the trusted host list 127 in step 202, nor has the user entered the correct password in step 204, then in step 205 the user has access to clear area 121 only. It will be appreciated that clear area 121 is optional; thus in the absence of a clear user area 121, the entire user area is secure area 122; in this case, step 205 is null, i.e. the user who accesses an entrusted computer and is unable to key-in the correct password does not get any access at all.

Figure 4:
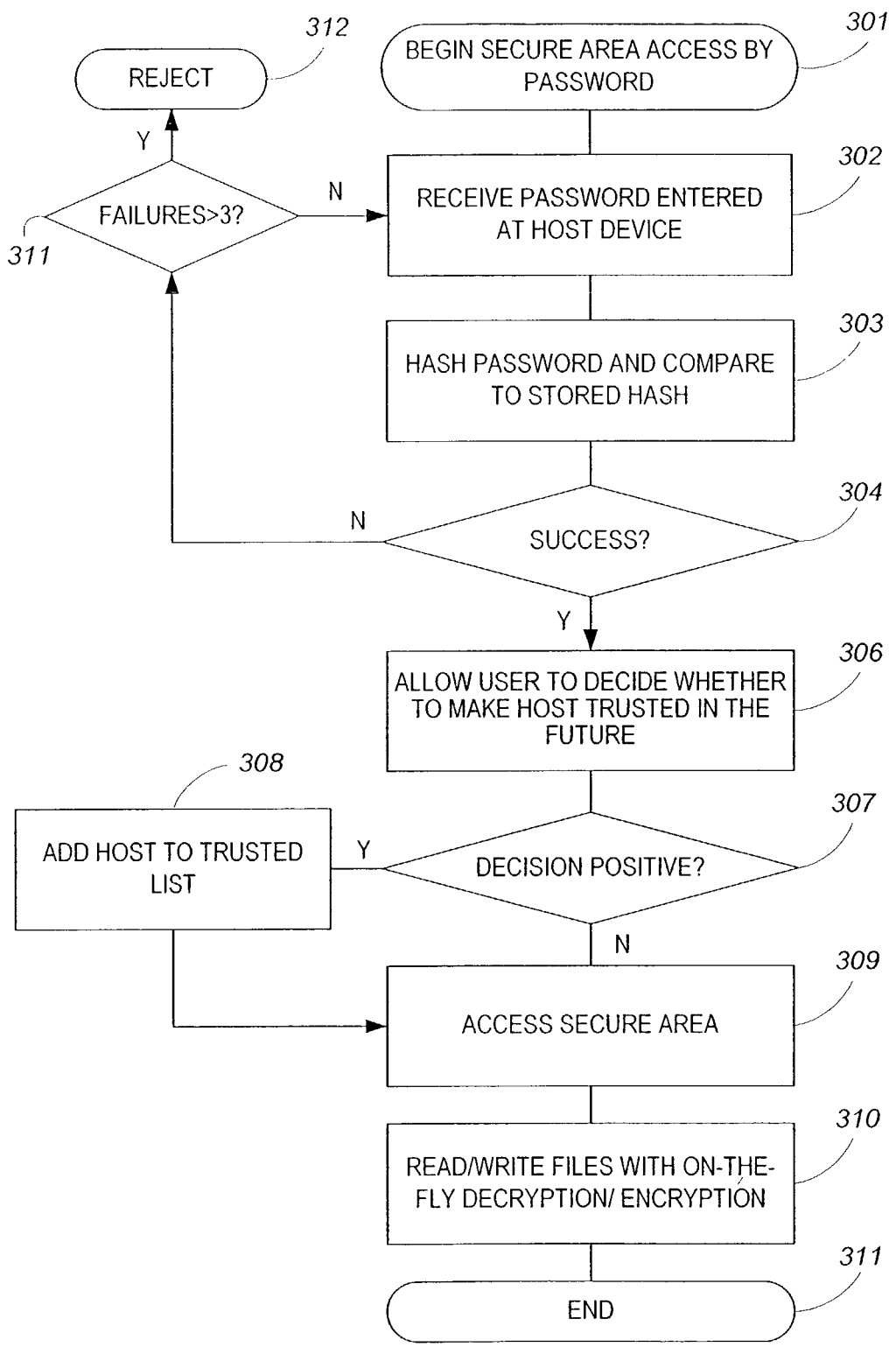
FIG. 4 is a flowchart of manual secure area access procedure which forms part of the first preferred embodiment of the present invention.

FIG. 4 describes in more detail the password entry and associated access of steps 204 and 206 of FIG. 3. The steps of FIG. 4 are executed by cooperation of utilities run on both CPU 102 and microprocessor 111. The procedure starts in step 301, related to the case of FIG. 3 where in step 202 automatic secure access has been denied and in step 203 the user has elected to enter an alleged password for manually accessing secure area 122. In step 302 the password entered at user interface 104 is received by microprocessor 111 via link 120. Alternatively, the password may be entered by the user directly into portable device 110 via a biometric reader, e.g. fingerprint reader, or a keyboard (not shown) embedded within portable device 110. In step 303, the entered password is hashed, and the hashed value is compared to the contents of register 124. The reason for storing and comparing hashed passwords rather than clear passwords is to protect the password from an attacker reading the password directly from storage medium 113 by disassembling portable storage device 110 and using an external reader. If in step 304 the password has been found incorrect, then the loop in steps 304-311-302 allows another two trials, and in case of failures access is denied in step 312, i.e. the user is allowed access only to clear area 121 (if such is available). In case that the correct password has been entered, then in step 306 the user is prompted, by a message on user interface 104, to select whether he/she wants to make the current host trusted in the future. If in step 307 the user has decided positively, then in step 308 the host ID's hash, along with an optional expiration date selected by the user, is added to trusted host list 127 of FIGS. 2 and 2A. In addition, the clear key used to encrypt secure area 122 is retrieved, using the user's password, from the first line of list 125 of FIG. 2B, and then is encrypted using the host's unique ID and added, along with the host ID's hash, as another line to list 125 of FIG. 2B. In any case, because the entered password has been found valid in step 304, the user now gets in step 309 access to secure area 122, which allows the user in step 310 to read and write files from and to secure area 122, as described in more detail in reference to FIG. 6 below. The procedure ends in step 311 after read/write operations have been concluded.

Figure 5:
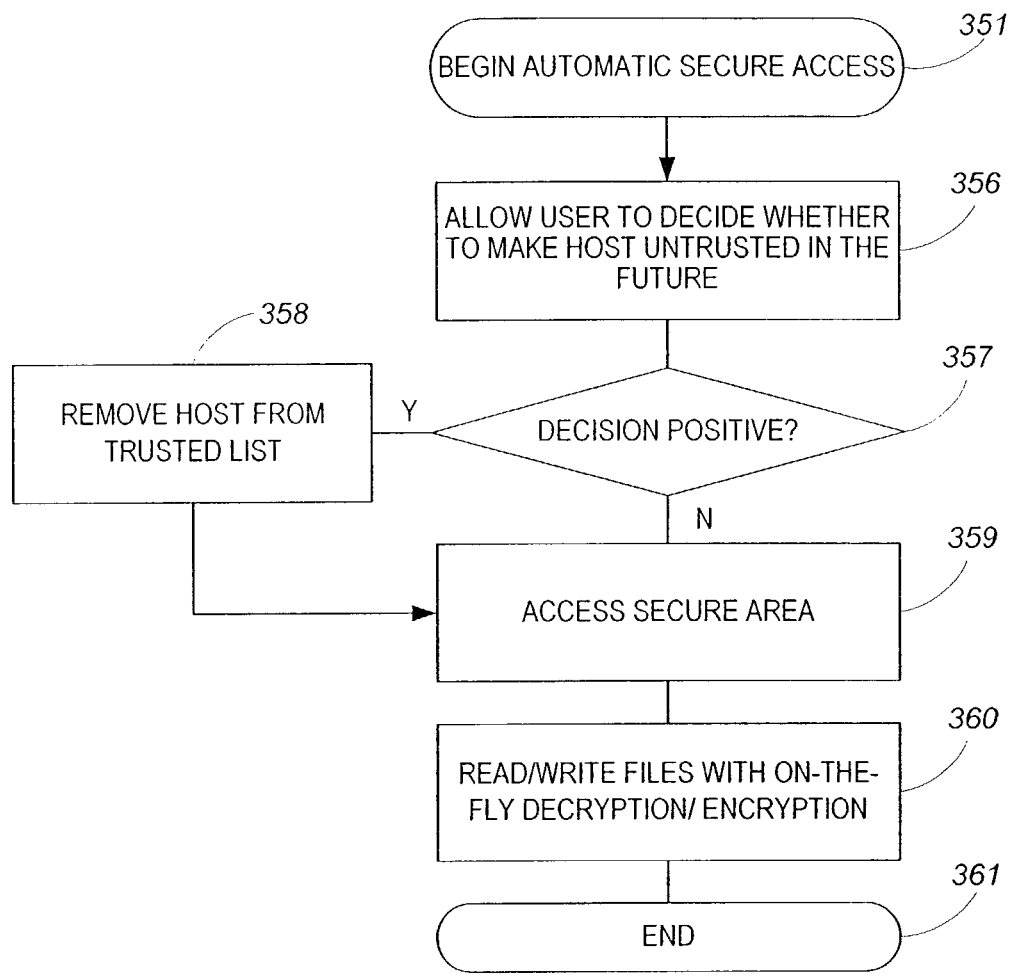
FIG. 5 is a flowchart of an automatic secure area access procedure which forms part of the first preferred embodiment of the present invention.

FIG. 5 is an expanded view of step 206 of FIG. 3. In step 351 the host has already been found trusted in step 202 of FIG. 3. In step 356 the user is offered an option, via user interface 104, to decide whether to exclude the host from the trusted host list 127, thus requiring manual password entry in future attempts to access secure area 122. If in step 357 the user has elected to remove the host from trusted host list 127, then in step 358 the host unique ID is removed from list 127; also, the line corresponding to this host in list 125 is removed as well. In steps 359-361 the user continues read/write operation on the secure area similarly to steps 309-311 of FIG. 4.

Figure 6:
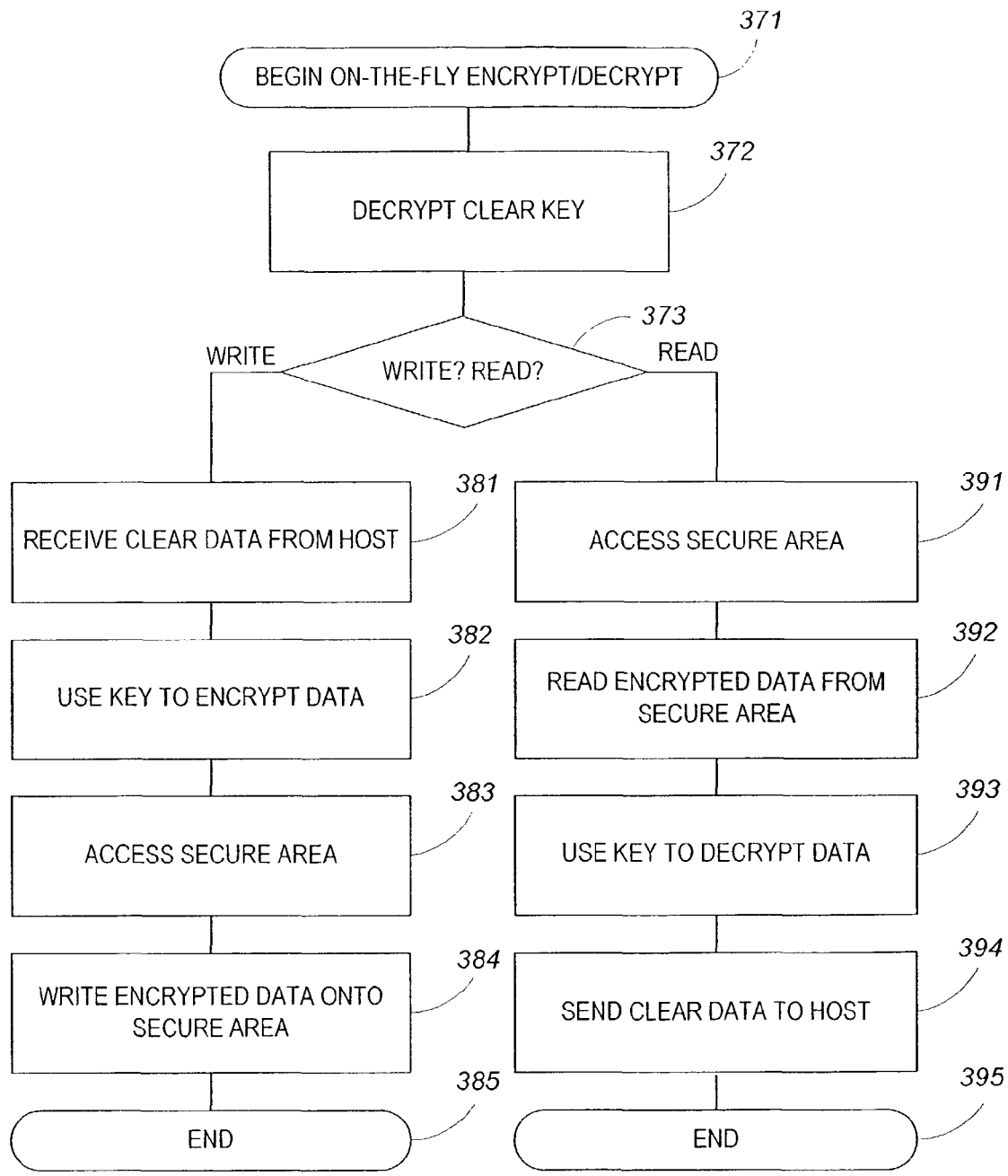
FIG. 6 is a flowchart of an on-the-fly encryption/decryption procedure which forms part of the first preferred embodiment of the present invention.

FIG. 6 describes in detail the read/write operations from/to secure area 122, mentioned in steps 310 and 360 of FIGS. 4 and 5, respectively. In step 371 access to the secure area has been allowed, i.e. microprocessor 111 has allowed CPU 102 to read from and write onto secure area 122. However, the data in secure area 122 is encrypted, whereas the data in host device 101 needs to be clear in order to be useful.

For the associated encryption and decryption, in step 372 microprocessor 111 retrieves the clear key from list 125 of FIGS. 2 and 2A. This is done by identifying whether access has been allowed using the user's password via a positive outcome of step 204 of FIG. 3, or via finding the host in the trusted host list 127 via a positive outcome of step 202 of FIG. 2; accordingly, the appropriate line of list 125 of FIG. 2B is identified, and the user's entered password or the host's unique ID are used to decrypt the clear key from the encrypted key which corresponds to the password or the trusted host. In step 373 the host decides whether the access to secure area 122 is for read or write.

Write operations start in step 381 with microprocessor 111 receiving clear data from CPU 102 via link 120. In step 382, the clear key obtained in step 372 is used by microprocessor 111 to encrypt the received data. In step 383, microprocessor 111 accesses secure area 122 using an access pointer from register 126, because the process has already verified, by a positive outcome of either step 202 or step 204 of FIG. 3 leading to step 206 of FIG. 3, that such access is allowed. In step 384, the data encrypted in step 382 is written to secure area 122, and in step 385 the procedure is concluded and control is returned to host device 101.

If in step 373 host device 101 has selected to make a read operation, then in step 391 microprocessor 111 allows access to the secure area using the appropriate pointer from register 126 of FIG. 2. In step 392 microprocessor 111 reads the encrypted data from secure area 122, and in step 393 the clear key retrieved in step 372 is used to decrypt the data in preparation for sending the data to the host in step 394 and returning control to the host in step 395.

A second preferred embodiment of the present invention replaces trusted host list 127 maintained in storage medium 113 with cookie files installed by storage medium 113 in host storage 103 (see FIG. 1).

Reference is now made to FIGS. 7, 7A and 8, which illustrate the second preferred embodiment of the present invention. System 100A now contains a host device 101A connectable via link 120 to a portable storage device 110A. As seen in FIG. 8, host device 101A is similar to host device 101 of FIG. 1, except that its host storage 103A contains, in addition to data 401 similar to the data contained in host storage 103, also a cookie file 400; and host ID register 106 is not needed for the present embodiment. Portable storage device 110A contains a storage medium 113A, which in comparison to storage medium 113 needs in encrypted key list 125 only the first record that relates to the user password (FIG. 2B). A cryptoprocessor 111A is added to device 110A and is embedded within microprocessor 111 or next to microprocessor 111, for storage and optionally for processing of critical security data such as storing keys and passwords and accessing the keys and passwords for various cryptographic operations described below in a tamper-resistant environment. Such tamper-resistant cryptoprocessors are known in the art in association with the integrated circuits embedded, for example, in smart payment cards, SIM cards used in cellular telephones, etc. Tamper-resistant cryptoprocessor 111A is preferably added to microprocessor 111 and storage medium 113A in order to avoid vulnerabilities associated with attackers reading the content of storage medium 113A by disassembling storage medium 113A from portable storage device 101A and attaching storage medium 113A to an external reader; crypto-processor 111A is expected to protect two critical keys stored in respective registers therein, a cryptographic clear key 397 and a trust key 398, to the extent that such attacks will become unfeasible or at least unattractive. A processor 399 is optionally included in crypto-processor 111A for performing internally and securely crypto-related calculations such as random number generation, public and private key generation, encryption and decryption, etc. Cookie file 400 is written to host storage device 103A by portable storage device 110A in order to identify host device 101A as a trusted device with respect to portable storage device 110A. It should be noted that the term "cookie file" is used herein to relate to a file written by portable storage device 110A onto host storage 103A to enable recognition of host device 110A by portable storage device 110A in the future.

Figure 9A:
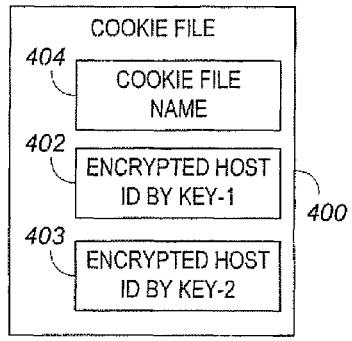
FIG. 9A is a schematic block diagram of a cookie file included in the second preferred embodiment of the present invention.
Figures 9B, 9C:
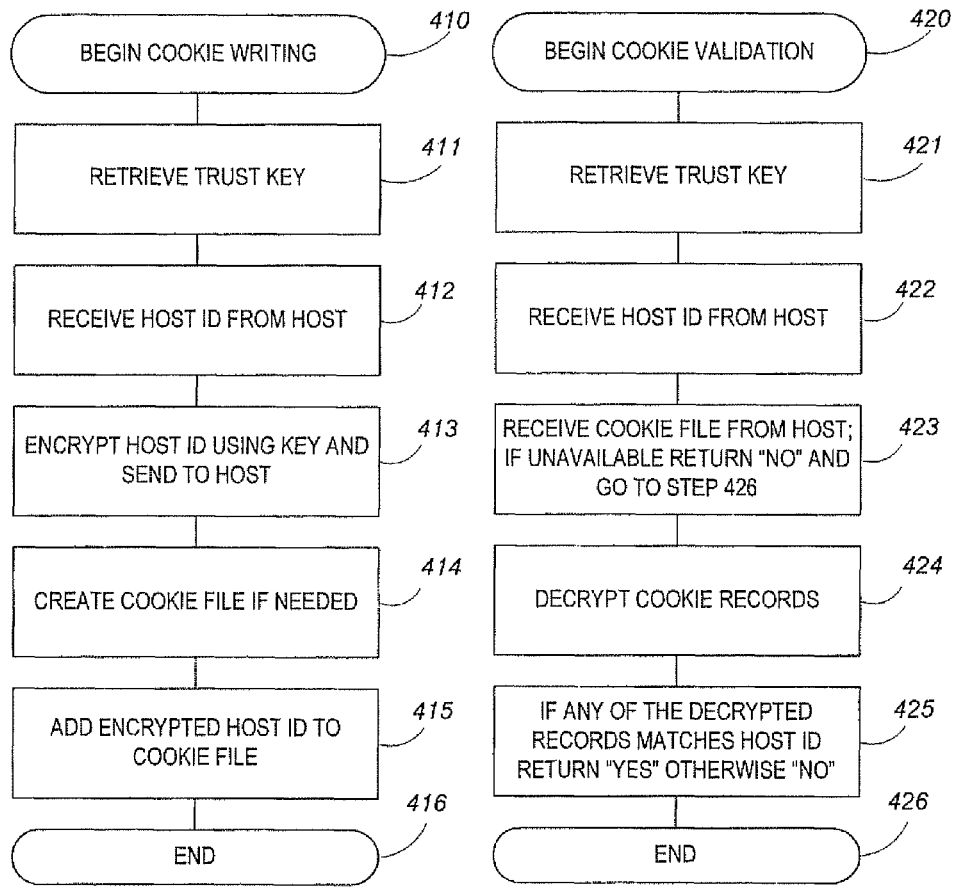
FIG. 9B is a flowchart describing writing the cookie file of FIG. 9A.
FIG. 9C is a flowchart describing validating the cookie file of FIG. 9A.

Reference is now made to FIGS. 9A-9C, which illustrate the basic structure and operations related to cookie file 400. Cookie file 400 includes a file name 404 that is accepted throughout the system constituted by any of several portable storage devices 110A, and by the set of host devices that potentially could be accessed or even made trusted by portable storage devices 110A. File name 404 is used by portable storage devices 110A that are mounted on host device 101A to identify cookie file 400. Cookie file 400 further includes a record 402, 403, etc. for each portable storage device 110A that allows access by host device 101A to its secure data area 122, because the same host 100A may be defined as trusted by more than one portable storage device 110A. Two such records 402, 403 are shown in FIG. 9A, but any number of records can be included in the general case of the second preferred embodiment of the present invention. Record 402 relates to a specific host device 101A, and includes a representation of the host's unique ID 106 encrypted by trust key 398 of crypto-processor 111A of the respective portable storage device 110A. Similarly, record 403 includes the same unique ID 106 of the specific host device 100A encrypted by trust key 398 of another portable storage device 110A.

When a portable storage device 110A is mounted on an untrusted host device 101A, and the user selects to make the host device trusted, then the procedure of FIG. 9B is initiated in step 410 to write the appropriate cookie 400 into storage 103A. In step 411, processor 399 of cryptoprocessor 111A retrieves trust key 398 from its register in cryptoprocessor 111A. In step 412 the host's unique ID 106 is retrieved from its register in host device 101A and is received by processor 399. In step 413, processor 399 uses trust key 398 to encrypt host ID 106, and then sends the encrypted host ID 106 to host 101A. In step 414, the existence of a cookie file 400 in host storage 103A is determined (host device 101A may already have a cookie file 400, for instance, as a result of another portable storage device 101A having already installed such a file), and if not, such a file is installed. In step 415, the encrypted host ID 106 is added to cookie file 400 thus making this host 101A trusted by this portable storage device 110A. The procedure is concluded in step 416 and the devices may be disconnected or continue other operations.

When portable device 110A is mounted on an unknown host device 101A in step 420, the procedures of FIG. 9C look fork a valid cookie record in order to determine whether this host 101A is trusted. In step 421, trust key 399 is retrieved by processor 399 from its respective register. In step 422, host ID 106 is received by processor 399 from its respective register via link 120. In step 423, cookie file 400 is received by processor 399 from host 101A via link 120; if such file is unavailable, the procedure will end up with "no" (i.e. the device is untrusted), and will be concluded in step 426. In step 424 trust key 399 retrieved in step 421 is used to attempt to decrypt all records of cookie file 400. In step 425, records that have been successfully decrypted are compared to host ID 106 received in step 422, and if there is a match the procedure will end up with "yes", i.e. device 101A is trusted, otherwise the conclusion is "no" (untrusted). The procedure is concluded in step 426.

Figure 10:
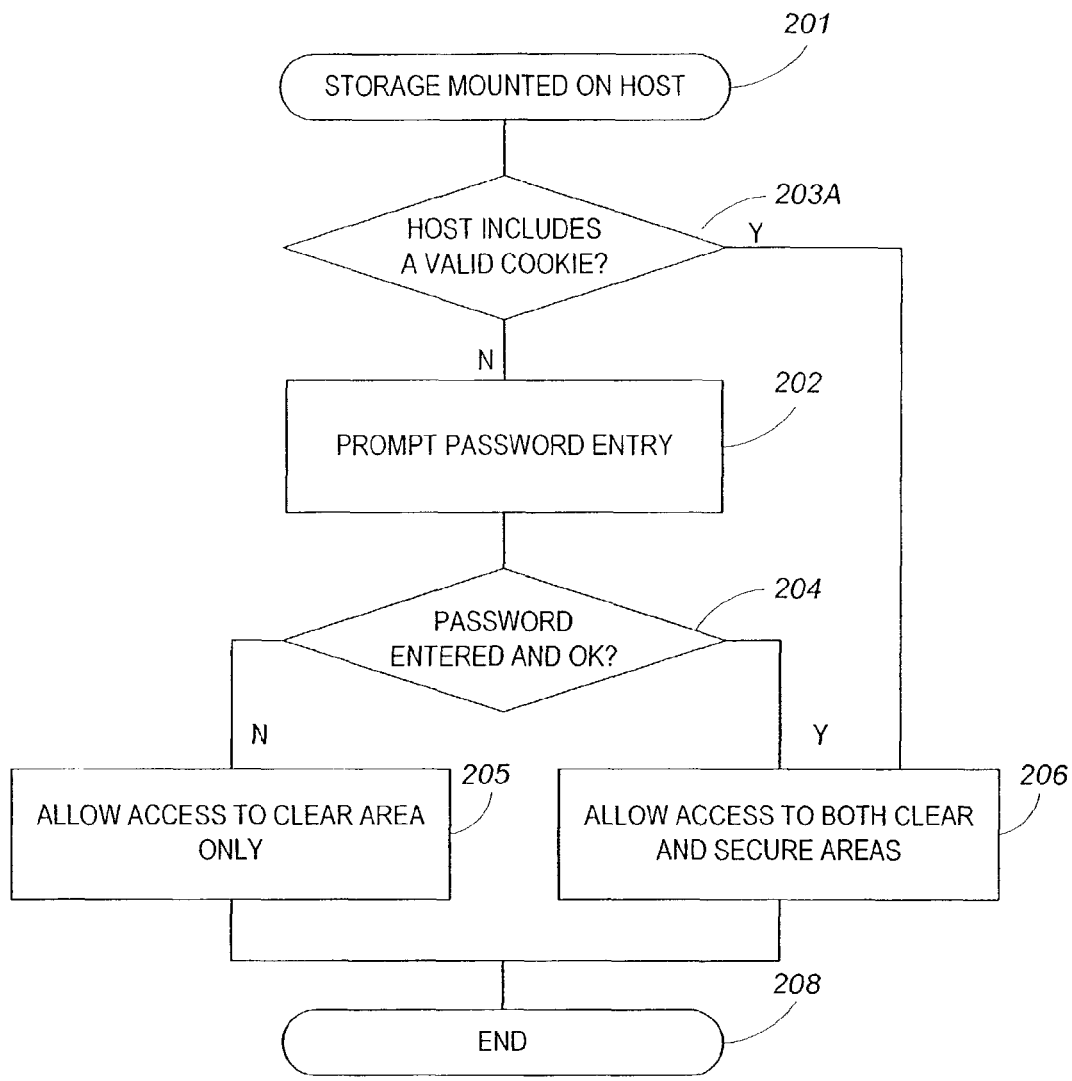
FIG. 10 is a flowchart describing the storage mounting procedure of the second preferred embodiment of the present invention
Figure 11:
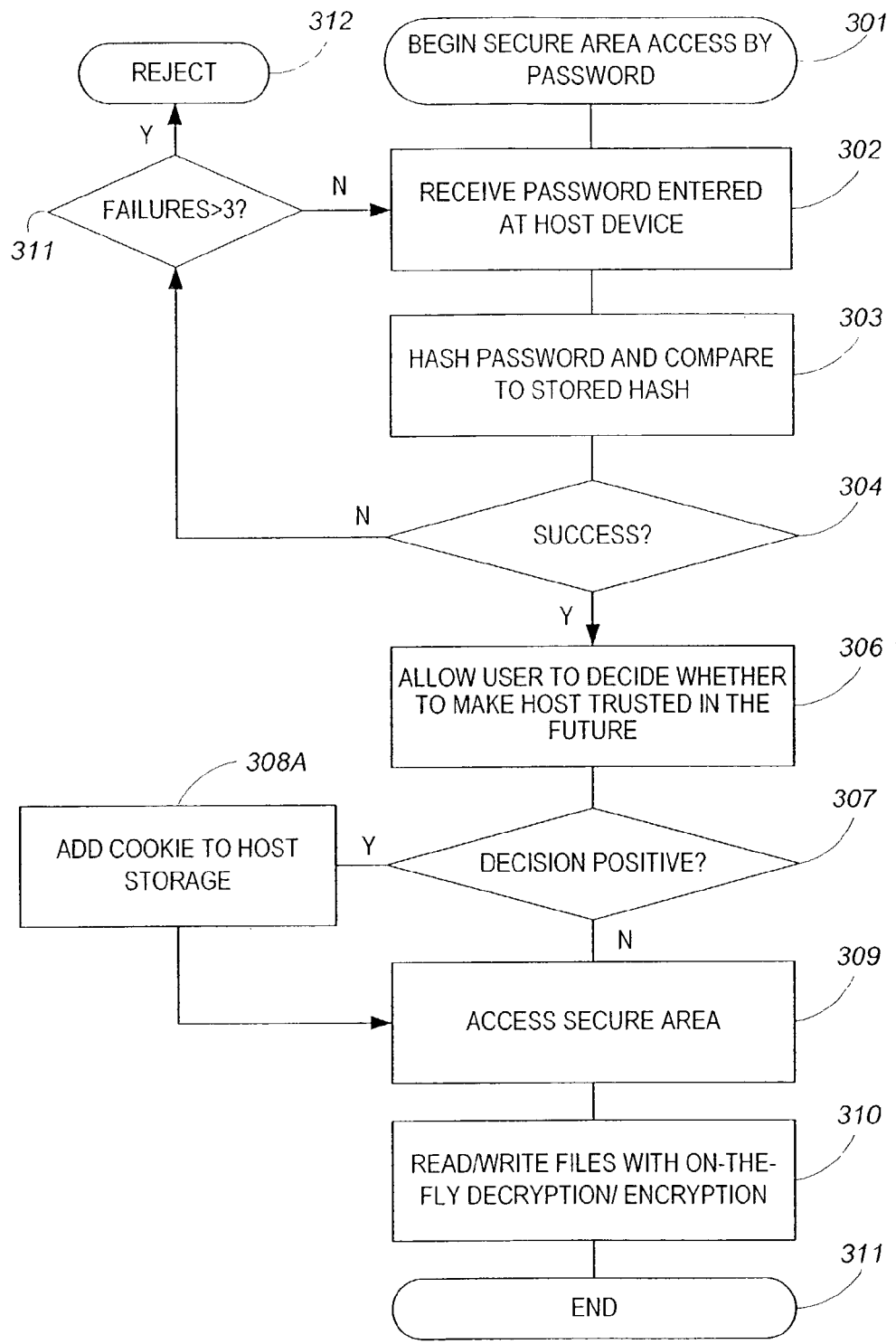
FIG. 11 is a flowchart describing the manual secure area access procedure according to the second preferred embodiment of the present invention.
Figure 12:
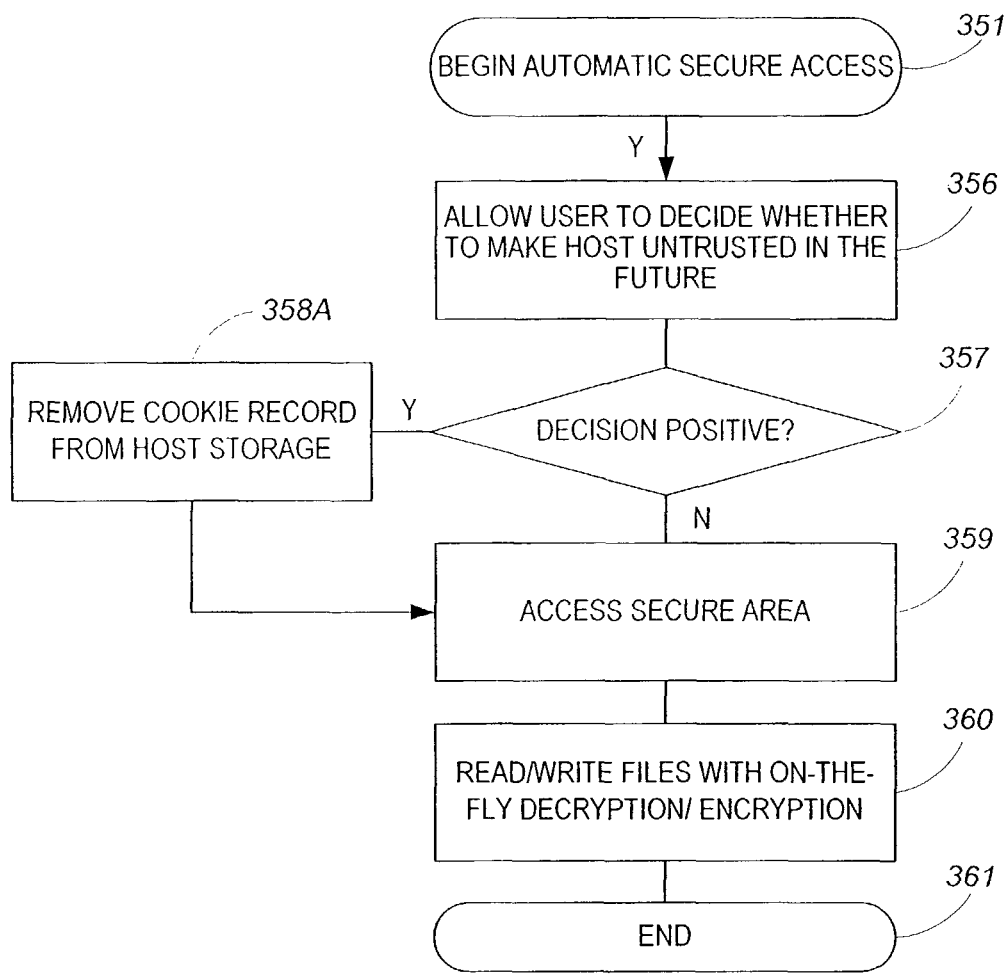
FIG. 12 is a flowchart describing the automatic secure area access procedure according to the second preferred embodiment of the present invention.

FIGS. 10-12 describe procedures that are similar in their purpose and steps to the procedures described in respect to FIGS. 3-5, respectively. The difference between FIGS. 10-12 and FIGS. 3-5 is that in FIGS. 10-12 a trusted host 101A is identified via a cookie file 400 written to the host 101A by the portable storage device rather than by a list of trusted hosts maintained at the portable storage device.

The steps of the procedure of FIG. 10 are identical to those of FIG. 3, except that step 203A replaces step 203. In step 203A, the existence of a valid cookie file in host 101A is ascertained via the procedure of FIG. 9C, ending up with "yes" or "no" and continuing accordingly.

The steps of the procedure of FIG. 11 are identical to the steps of FIG. 4, except that step 308A replaces step 308, making a host device 101A trusted by adding a cookie record to host storage 103A via the procedure of FIG. 9B.

The steps of the procedure of FIG. 12 are identical to the steps of FIG. 5, except that step 358A replaces step 358, making a previously-trusted host device 101A untrusted by removing from cookie file 400 the cookie record which had been obtained by encrypting host ID 106 with trust key 398.

Clear key 397 included in cryptoprocessor 111A of FIG. 7A is used for on-the-fly encryption and decryption relating to secure files stored on storage medium 113A. The distinction between trust key 398 and clear key 397 is for the purpose of the trust reset procedure described with reference to FIG. 18 below.

Figure 13:
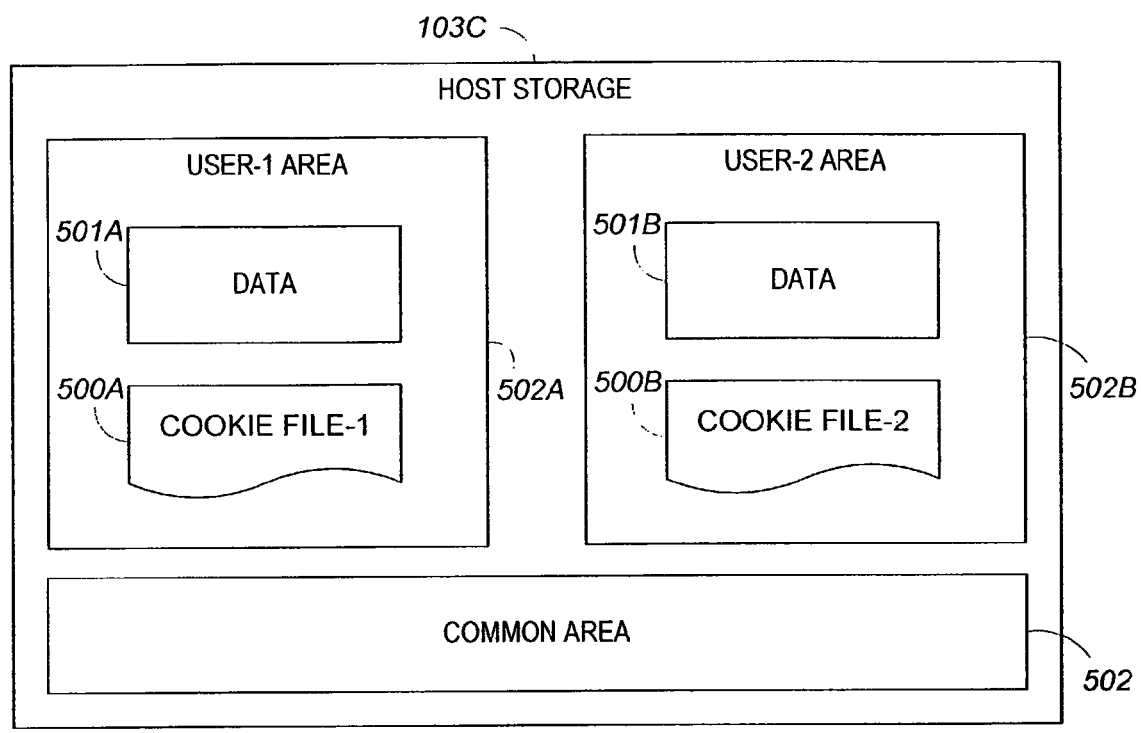
FIG. 13 is a block diagram of the host storage device of another preferred embodiment of the present invention.

FIG. 13 illustrates a third preferred embodiment of the present invention. The preferred embodiment of FIG. 13 is a variation of the second preferred embodiment described above. Host storage device 103C contains a multiplicity of user login areas, out of which two (502A and 502B) are shown. This situation is common in the art, wherein a plurality of users share a single computer, with each user having a respective login username and a respective login password.

When a user logs in, he or she gains access to a common area 502 containing a common operating system and program files, and his or her private user area, for example a user area 502A, that contain his or her data files 501A and a cookie file 500A. Then all references to the creation and validation of cookie file 400 described in respect to FIGS. 8-12 above now relate to cookie file 500A. Thus, the same computer having host storage device 103C is recognized as a trusted host by a particular portable storage device 110A if logged-in by a particular user, and will be untrusted when logged-in by another user.

A fourth preferred embodiment of the present invention expands the case of the third preferred embodiment to the host-server scenario, wherein all or part of the user area is hosted on a central server. In such scenarios, which are common in many offices, a user can log into a network and gain access to his or her user area from any computer connected to the server. Accordingly, "trusted host" becomes any computer connected to the network and logged in so as to have access to the user area containing the appropriate cookie file 500.

Of the two basic methods taught herein of associating a host with a portable storage device, the trusted host list of the first embodiment and the cookie file of the second embodiment, the latter is preferred in the contexts of the third and fourth embodiment, because of the inherent difficulty in defining unique IDs for separate logical partitions of a single physical host computer (third embodiment) or of a network (fourth embodiment).

A fifth preferred embodiment of the present invention combines the teachings of the first and the second or third preferred embodiments described above. Thus, a trusted host is identified by a portable storage device both by including the trusted host's ID in a list of trusted host maintained at the portable storage device and by the portable storage device writing a cookie file to the storage medium of the host device.

Figure 14:
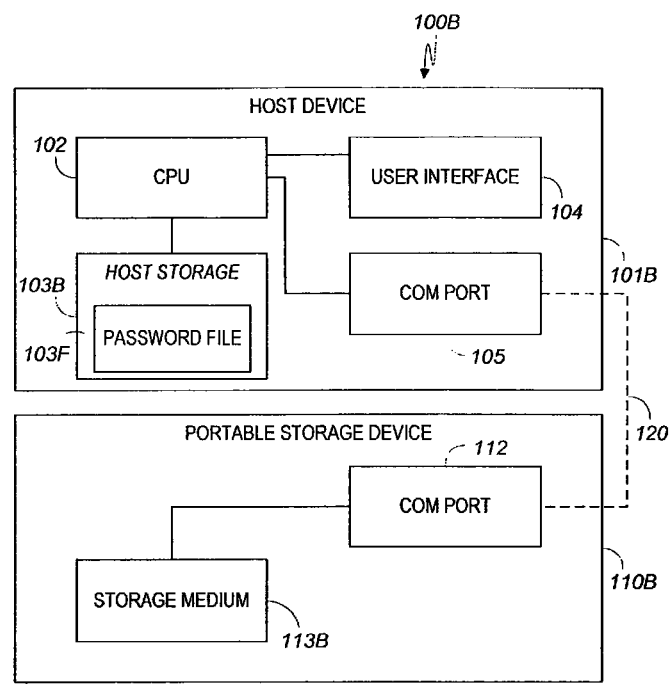
FIG. 14 is a block diagram of still another preferred embodiment of a system according to the present invention.

A sixth preferred embodiment of the present invention relates to the case wherein there is no autonomous microprocessor on the portable storage device, or alternatively, if such a microprocessor exists, it does not take part in controlling access to the secure data area of the portable storage device. FIG. 14 illustrates a system 100B of the present invention, wherein a host device 1011B contains in a host storage 103B a password file 103F. A storage medium 113B of portable storage device 110B is illustrated in more detail in FIG. 15, wherein storage medium 113B is shown as containing secure user data in a secure user data area 122B, optionally clear user data in a clear user data area 121B, host programs in a host program area 128B, and a unique storage ID in a register 113D. The storage ID in register 113D is used to identify portable storage device 113B where more than one such device may be mounted on the same host device 101B. A password register 113P includes the password, or preferably a hash of the password, whose entry is a condition for a security application included in host program area 128B to allow access to data stored in secure user area 122B.

Figure 15:
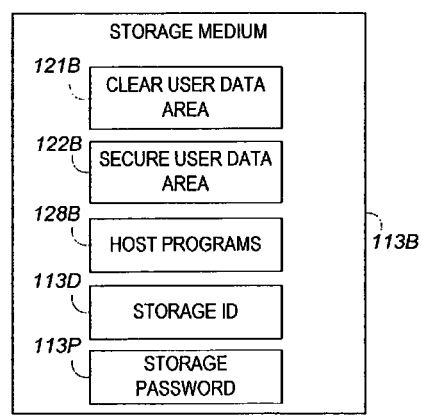
FIG. 15 is a block diagram of the storage medium included in the system of FIG. 14.

Password file 103F (FIG. 16) includes a table of passwords of portable storage devices 110B whose owners have selected to make host device 101B trusted via the procedure of FIG. 17A below. Password file 103F may contain zero or more records, each identifying the trusting portable storage device 110B by its ID, and matching to it its password, or biometric signature, usable to unlock secure area 122B of storage medium 113B (FIG. 15).

Reference is now made to FIG. 17A which describes the procedure of making a host device 101B trusted by a portable storage device 110B. In step 601 portable storage device 110B is mounted on a still-untrusted host device 101B. In step 602, a security application carrying out security functions related to portable storage device 110B is loaded from host program storage area 128B to be run on CPU 102; the security application runs all encryption and decryption tasks in respect to secure data stored in area 122B. In step 603, the user enters via user interface 104 a password, which is compared (directly or by comparing hashed versions) to the contents of register 113P. A successful entry is a condition for the rest of the procedure below. In step 604 the user selects, via user interface 104, to make the host trusted in the future. As a result, in step 605 the password, along with the storage ID in register 113D of portable device 113B, are added as another record to password file 103F (FIG. 16). In step 606, read/write operations with on-the-fly decryption/encryption, respectively, are made by CPU 102 on secure user area 122B, under the security program loaded from host program storage area 128B, and using a clear key that is stored in storage medium 113B. The clear key could be the password in register 113P, or alternatively could be a random clear key encrypted using the password stored in register 113P. In step 607, storage device 110B is dismounted from host 101B.

FIG. 17B describes the procedure of portable storage device 110B cooperating with a host device 101B. In step 611 storage device 110B is mounted on host 101B. In step 612 the security application is loaded from host program storage area 128B of portable storage device 110B to be run on CPU 102. In step 613, the security application reads password file 103F from host storage 103B, and seeks the record of password file 103F that includes the host ID of register 113D. If such a record is found, indicating that this host device 101B previously was made trusted using the procedure of FIG. 17A, then this host device 101B is allowed access to secure user data area 122B. The password that matches this host ID is used subsequently for all on-the-fly decryption and encryption tasks in step 616 associated with read and write operations in respect to secure user data area 122B. Alternatively, a random clear key encrypted using the password stored in register 113P is used for all on-the-fly decryption and encryption tasks in step 616. In step 617, storage device 110B is dismounted from host device 101B. The procedure of FIG. 17B optionally includes a step (not shown) of selectably making a trusted host untrusted in the future, by removing the respective record containing the portable device's password from password file 103F.

This sixth preferred embodiment, like the other preferred embodiments, allows the user to make a trusted host device untrusted for the future, during a session in which the two devices are connected. The following procedure is used for making all trusted hosts untrusted simultaneously by a portable storage device of any of the preferred embodiments. In this case, password entry is required for all subsequent mountings of the portable storage device, with the option to make selected devices trusted, thus password-free, based on new choices of the user.

Figure 18:
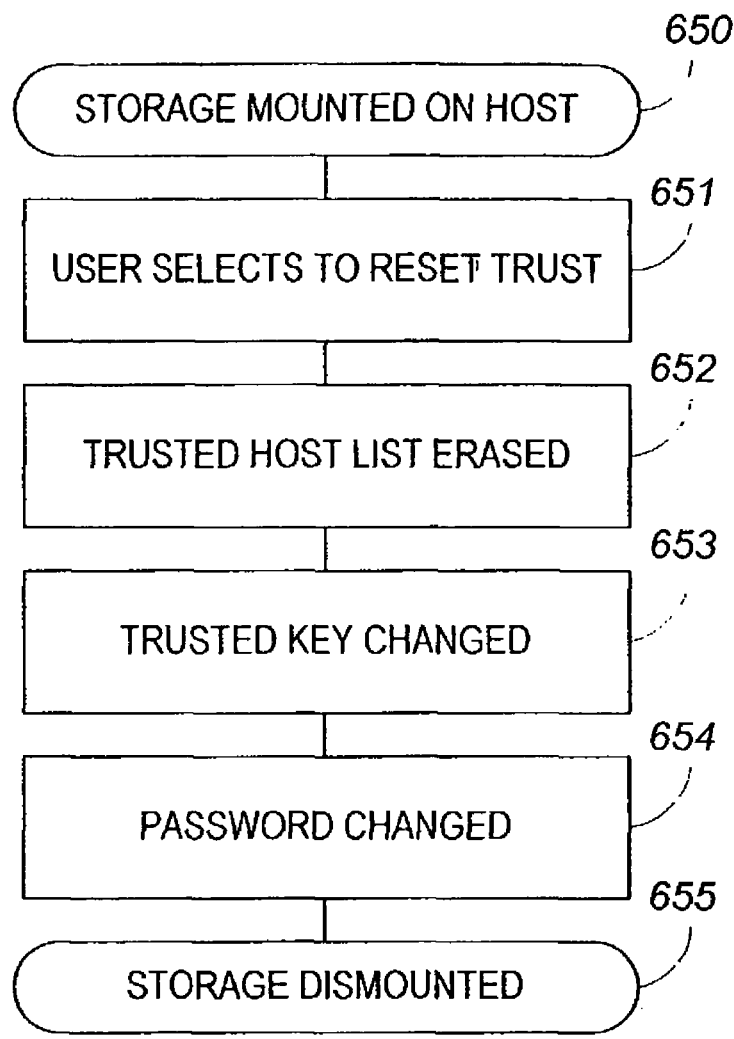
FIG. 18 is a flowchart describing a trust reset procedure of the present invention.

Reference is now made to FIG. 18. In step 650 portable storage device 110, 110A or 110B is mounted on host device 101, 101A or 101B, respectively; the correct password is entered, or the host is found trusted. In step 651 the user selects to reset the trust function of his portable storage device, i.e. to make all currently-trusted hosts untrusted. In step 652, if trusted host list 127 has been used on portable storage device 110 (FIGS. 2 and 2A), then trusted host list 127 and register 125 (FIG. 2B) are erased except for the first record of register 125. In step 653, if cookie files were installed on trusted hosts 101A, then trust key 398 of FIG. 7A is changed, thereby making all such cookie files unrecognizable by portable storage device 110A. In step 654, if password copies were left in password files 103F of hosts 101B, then the user is prompted to change his or her password, thus making hosts 101B unrecognizable.

In step 655 portable storage device 110, 110A or 110B is dismounted from host device 101, 101A or 101B, respectively, and will not recognize any previously-trusted device until any of the procedures of FIG. 4, 9B or 17A is executed.

While the invention has been described with respect to a limited number of embodiments, it will be appreciated that many variations, modifications and other applications of the invention may be made.

What is claimed is:

1. A data storage device comprising:
   a storage medium comprising: an unsecure user data area to store unsecure user data and a secure user data area to store secure user data, wherein upon handshaking between the data storage device and a host device, the unsecure user data area becomes accessible to the host device; and
   a processor in communication with the storage medium, the processor configured to:
      receive a host identifier and a file from a host device, the file previously sent from the data storage device in a prior mounting to the host device to enable the data storage device to recognize the host device, wherein the file comprises a record, the record includes a unique identifier portion which represents a unique identifier of a host device encrypted by a trusted key of the data storage device,
      decrypt the unique identifier portion of the record using the trusted key,
      determine whether the decrypted unique identifier portion matches the host identifier received from the host device,
      in response to determining that the decrypted unique identifier portion matches the host identifier received from the host device, determine that the host device is a trusted host device,
      in response to determining that the host device is a trusted host device, allow automatic access of the host device to said secure user data on the storage medium,
      in response to determining that the host device is not a trusted host device:
         deny automatic access, but cause entry of a user password for access to said secure user data,
         determine whether the user password matches at least one password stored on the data storage device, and
         in response to determining that the user password matches the at least one password, allow access by the host device to said secure user data on the storage medium.

2. The data storage device of claim 1, wherein said processor is further configured to:
   to convert an untrusted host device to a trusted host device.

3. The data storage device of claim 1, wherein said processor is further configured to:
   to convert one of a plurality of trusted host devices into an untrusted host device.

4. A method of using a data storage device together with a host device, the data storage device including an unsecure user data area to store unsecure user data and a secure user data area to store secure user data, wherein upon handshaking between the data storage device and the host device, the unsecure user data area becomes accessible to the host device, the method comprising:
   in the data storage device:
      receiving a host identifier and a file from the host device, the file previously sent from the data storage device in a prior mounting to the host device to enable the data storage device to recognize the host device, wherein the file comprises a record, the record includes a unique identifier portion which represents a unique identifier of a host device encrypted by a trusted key of the data storage device;
      decrypting the unique identifier portion of the record using the trusted key,
      determining whether the decrypted unique identifier portion matches the host identifier received from the host device,
      in response to determining that the decrypted unique identifier portion matches the host identifier received from the host device, determining that the host device is a trusted host device;
      in response to determining that the host device is a trusted host device, allowing automatic access of said host device to the secure user data stored in the data storage device;
      in response to determining that the host device is not a trusted host device:
         denying automatic access but causing entry of a user password for access to said secure user data;
         determining whether the user password matches at least one password stored on the data storage device, and
         in response to determining that the user password matches the at least one password, allowing access to the host device to said secure user data on the storage medium.

5. The method of claim 4, further comprising designating said host device, on which the data storage device is mounted, as a trusted host device in response to said determination being negative and in response to said user password being a valid user password.

6. The data storage device of claim 1, wherein the processor is further configured to create the file by creating a cookie file for sending to the host device in the prior mounting of the data storage device to the host device.

7. The data storage device of claim 1, wherein the processor is further configured to create the file based on information received from the host device in the prior mounting of the data storage device to the host device.

8. The data storage device of claim 7, wherein the information received from the host device comprises the unique identifier portion; and
   wherein the processor is configured to create the file by including the unique identifier portion within the file.

9. The data storage device of claim 1, wherein the file comprises a cookie file generated by the data storage device.

10. The data storage device of claim 1, wherein the file is indicative of being generated from multiple data storage devices.

11. The data storage device of claim 10, wherein the file is indicative of the host device being a trusted device for each of the multiple data storage devices.

12. The method of claim 4, further comprising converting the trusted host device to an untrusted host device.

13. The method of claim 4, further comprising creating a cookie file; and
   wherein sending the file to the host device comprises sending the cookie file to the host device.

14. The method of claim 4, further comprising creating the file based on information received from the host device in the prior mounting of the data storage device to the host device.

15. The method of claim 14, wherein the information received from the host device comprises the unique identifier portion; and
    wherein creating the file comprises including the unique identifier portion within the file.

16. The method of claim 4, wherein the file comprises a cookie file generated by the data storage device.

17. The method of claim 4, wherein the file is indicative of being generated from multiple data storage devices.

18. The method of claim 17, wherein the file is indicative of the host device being a trusted device for each of the multiple data storage devices.

\* \* \* \* \*